(12) United States Patent
Hofmann

(10) Patent No.: US 7,433,372 B2
(45) Date of Patent: Oct. 7, 2008

(54) DEVICE AND METHOD TO STABILIZE BEAM SHAPE AND SYMMETRY FOR HIGH ENERGY PULSED LASER APPLICATIONS

(75) Inventor: Thomas Hofmann, San Diego, CA (US)

(73) Assignee: Cymer, Inc., San Diego, CA (US)

( * ) Notice: Subject to any disclaimer, the term of this patent is extended or adjusted under 35 U.S.C. 154(b) by 137 days.

(21) Appl. No.: 11/447,380

(22) Filed: Jun. 5, 2006

(65) Prior Publication Data
US 2007/0279747 A1 Dec. 6, 2007

(51) Int. Cl.
*H01S 3/10* (2006.01)
(52) U.S. Cl. .............................. 372/9; 372/57; 372/107
(58) Field of Classification Search ................... 372/92, 372/9
See application file for complete search history.

(56) References Cited

U.S. PATENT DOCUMENTS 7,009,140 B2 3/2006 Hofmann ............... 219/121.65

2004/0136417 A1* 7/2004 Webb et al. ................... 372/25
2004/0182838 A1 9/2004 Das et al. ............... 219/121.76
2005/0259709 A1 11/2005 Das et al. ....................... 372/55

OTHER PUBLICATIONS

U.S. Appl. No. 11/261,948, filed Oct. 28, 2005, Das et al.
U.S. Appl. No. 11/447,379, filed Jun. 5, 2006, Hofmann.
U.S. Appl. No. 60/811,242, filed Jun. 5, 2006, Reiley et al.

* cited by examiner

*Primary Examiner*—Dung T Nguyen
(74) *Attorney, Agent, or Firm*—Matthew K. Hillman

(57) ABSTRACT

A beam mixer for increasing intensity symmetry along a selected axis of a beam (wherein the beam extends from a first edge to a second edge along the axis) is disclosed and may include a plurality of mirrors establishing a spatially inverting path. For the beam mixer, the inverting path may have a beginning and an end and may be characterized in that a part of the beam near the first beam edge at the beginning of the path translates to the second beam edge at the end of the path. For this aspect, the beam mixer may further include an optic dividing the beam into first and second beam portions, the optic placing the first portion onto the inverting path and recombining the first and second portions onto a common path after the first portion has traveled along the inverting path thereby mixing the beam.

12 Claims, 3 Drawing Sheets

DEVICE AND METHOD TO STABILIZE BEAM SHAPE AND SYMMETRY FOR HIGH ENERGY PULSED LASER APPLICATIONS

CROSS-REFERENCE TO RELATED APPLICATIONS

The present invention is related to copending, co-owned U.S. patent application Ser. No. 11/447,379 entitled, "DEVICE AND METHOD TO CREATE A LOW DIVERGENCE, HIGH POWER LASER BEAM FOR MATERIAL PROCESSING APPLICATIONS" by Hofmann, filed concurrently herewith, to copending, co-owned U.S. patent application 60/811,242 entitled, "HIGH POWER EXCIMER LASER WITH PULSE STRETCHER" to Hofmann et al., filed concurrently herewith, to U.S. application Ser. No. 11/261,948, titled "SYSTEMS AND METHODS FOR GENERATING A LASER SHAPED AS A LINE BEAM," filed on Oct. 28, 2005, to U.S. application Ser. No. 10/781,251, titled "VERY HIGH ENERGY, HIGH STABILITY GAS DISCHARGE LASER SURFACE TREATMENT SYSTEM," filed on Feb. 18, 2004, to U.S. application Ser. No. 10/884,101, titled "LASER THIN FILM POLY-SILICON ANNEALING OPTICAL SYSTEM," filed on Jul. 1, 2004, and to U.S. application Ser. No. 11/138,001, titled "SYSTEMS AND METHODS FOR IMPLEMENTING AN INTERACTION BETWEEN A LASER SHAPED AS A LINE BEAM AND A FILM DEPOSITED ON A SUBSTRATE" filed on May 26, 2005, the disclosures of each of which are hereby incorporated by reference herein.

FIELD OF THE INVENTION

The present invention relates to pulsed, gas discharge lasers. The present invention is particularly, but not exclusively, useful as a beam mixer for increasing the intensity symmetry of a high power Excimer gas discharge laser beam.

BACKGROUND OF THE INVENTION

In many applications, it is desirable that the shape and/or symmetry of pulses within a high energy pulse train are stable from pulse-to-pulse. By way of example, but not limitation, one such application is the use of a high-energy, pulsed laser beam to melt an amorphous silicon film to induce crystallization of the film upon re-solidification, for the purpose of manufacturing thin film transistors (TFT's).

Laser crystallization of an amorphous silicon film that has been deposited on a substrate, e.g., glass, represents a promising technology for the production of material films having relatively high electron mobilities. Once crystallized, this material can then be used to manufacture (TFT's) and in one particular application, TFT's suitable for use in relatively large liquid crystal displays (LCD's). Other applications for crystallized silicon films may include Organic LED (OLED), System on a Panel (SOP), flexible electronics and photovoltaics. In more quantitative terms, high volume production systems may be commercially available in the near future capable of quickly crystallizing a film having a thickness of about 90 nm and a width of about 700 mm or longer.

Laser crystallization may be performed using pulsed laser light that is optically shaped to a line beam, e.g., laser light that is focused in a first axis, e.g., the short-axis, and expanded in a second axis, e.g., the long-axis. Typically, the first and second axes are mutually orthogonal and both axes are approximately orthogonal to a central ray traveling toward the film. An exemplary line beam for laser crystallization may have a beam width at the film of less than about 20 microns, e.g. 3-4 microns, and a beam length of about 700 mm, or larger. With this arrangement, the film can be scanned or stepped in a direction parallel to the beam width to sequentially melt and subsequently crystallize a film having a substantial length, e.g., 900 mm or more.

In some cases, e.g., sequential lateral solidification processes, it may be desirable to ensure that the silicon film is exposed using a beam having an intensity that is relatively uniform across the long-axis. For this purpose, homogenizers e.g. lenslet arrays (so-called fly's eye arrays) or diffusers are typically used in the projection optics downstream of the laser to produce a beam of uniform intensity. However, these homogenizers operate most effectively if the beam input to the homogenizer has a symmetrical intensity profile. Fluctuations in laser beam shape and symmetry may lead to a corresponding degradation in beam uniformity at the exit of beam homogenizers. This non-uniformity, in turn, can undesirably create regions of non-uniformly crystallized silicon.

Excimer gas discharge laser sources are capable of producing the high power pulses suitable for generating a laser crystallization line beam, as described above. For example, a typical excimer laser source may emit a beam having a cross-section with a short axis of about 3 mm and a long axis of about 12 mm. This beam can then be homogenized and shaped into the line beam, as described above. While the pulse shape and intensity symmetry along the short axis is typically stable and close to Gaussian, the intensity along the long axis is generally non-symmetrical and unstable from pulse to pulse. Thus, if untreated, these pulses may not be homogenized properly and may result in a line beam having undesirable intensity variations along its length.

With the above considerations in mind, Applicant discloses a beam mixer for increasing intensity symmetry along a selected axis of a beam and a laser source incorporating a beam mixer.

SUMMARY OF THE INVENTION

In a first aspect of an embodiment of the invention, a beam mixer for increasing intensity symmetry along a selected axis of a beam (wherein the beam extends from a first edge to a second edge along the axis) may include a plurality of mirrors establishing a spatially inverting path. For the beam mixer, the inverting path may have a beginning and an end and may be characterized in that a part of the beam near the first beam edge at the beginning of the path translates to the second beam edge at the end of the path. For this aspect, the beam mixer may further include an optic dividing the beam into first and second beam portions; the optic placing the first portion onto the inverting path and recombining the first and second portions onto a common path after the first portion has traveled along the inverting path thereby mixing the beam.

In one embodiment, the optic may be a beam splitter reflecting the first portion of the beam onto the inverting path, and in a particular embodiment, the plurality of mirrors may comprise three mirrors, e.g. three flat mirrors. In one arrangement, the inverting path may extend substantially orthogonal to the common beam path.

In another aspect of an embodiment, a beam mixer for altering an intensity profile along a selected axis of a beam (wherein the beam extends from a first edge to a second edge along the axis) may comprise an optical inverting means for translating a part of the beam near the first beam edge at a first location along the beam to the second beam edge at a second location along the beam; and a means for directing a first portion of the beam to the inverting means, directing a second portion onto a common beam path and directing an output of the inverting means onto the common beam path.

In one embodiment of this aspect, the directing means may comprise a beam splitter and in a particular embodiment the beam splitter may reflect about 40 to 60 percent of light incident upon the beam splitter to the inverting means. The inverting means may comprise a plurality of mirrors and in one arrangement, the plurality of mirrors may be three flat mirrors. In a particular arrangement, the three flat mirrors may include a first mirror, second mirror and third mirror with the first mirror oriented to receive a beam from the directing means at an angle of incidence of approximately thirty degrees, the second mirror oriented to receive a beam from the first mirror at an angle of incidence of approximately thirty degrees, and the third mirror oriented to receive a beam from the second mirror at an angle of incidence of approximately thirty degrees.

An additional aspect of an embodiment may include a laser source comprising: an oscillator producing a beam, an amplifier amplifying the beam and a beam mixer increasing intensity symmetry along a selected axis of the beam. In one arrangement, the amplifier may output an amplified beam and the beam mixer may be positioned to increase intensity symmetry along a selected axis of the amplified beam. In another arrangement, the oscillator may output a seed beam and the beam mixer may be positioned to increase intensity symmetry along a selected axis of the seed beam and produce an output for amplification by the amplifier.

DETAILED DESCRIPTION OF PREFERRED EMBODIMENTS

Figure 1:
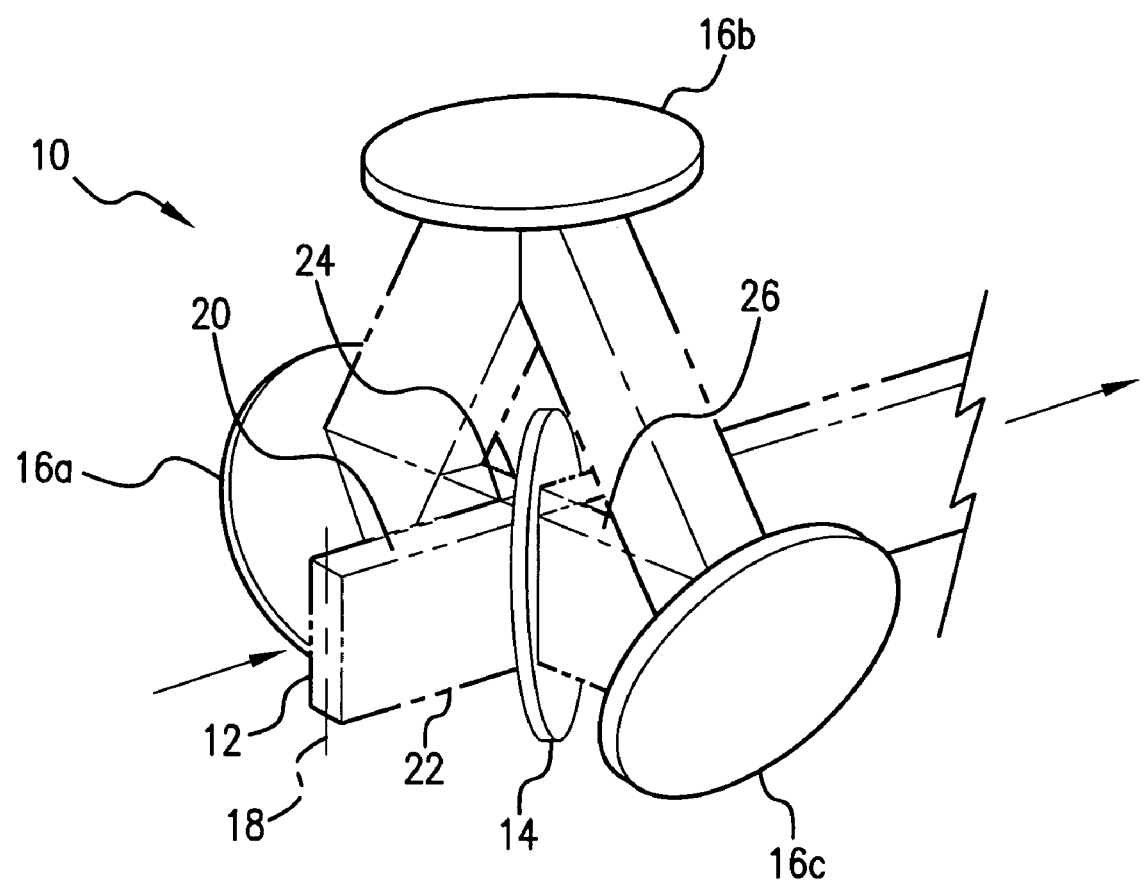
FIG. 1 shows a simplified perspective view of a beam mixer, shown, for the purposes of illustration, mixing a beam having a white half and a black half as incident on the mixer.

Referring initially to FIG. 1, a beam mixer 10 is shown for operation on a beam 12 (which for illustrative purposes has been shown as having an upper white-half and a lower black half). As explained in greater detail below, the beam mixer 10 can be used to alter the intensity profile of a beam, e.g. improving intensity symmetry along a selected axis of a beam, can be used to reduce beam coherency, or both. For the embodiment shown, the beam mixer 10 includes a beam splitter 14 and mirrors 16a-c.

For the arrangement shown in FIG. 1, the beam is initially incident upon the beam splitter 14 whereupon a portion of the beam is directed, via reflection, toward mirror 16a and the remainder is transmitted (with substantially no change in direction) through the beam splitter 14 and exits the beam mixer on an output beam path. In one setup, a beam splitter reflecting about forty to sixty percent of the incident light, e.g. fifty percent, may be used. For this setup, about fifty percent of the initial beam incident upon the beam splitter 14 is directed toward the mirror 16a. For the beam mixer 10, mirrors 16a-c are typically flat, maximum reflectivity mirrors. As shown in FIG. 1, mirror 16a may be positioned and oriented to receive light from the beam splitter 14 at an angle of incidence of approximately thirty degrees. As further shown mirror 16b may be positioned and oriented to receive light reflected from mirror 16a at an angle of incidence of approximately thirty degrees, and mirror 16c may be posItioned and oriented to receive light reflected from mirror 16b at an angle of incidence of approximately thirty degrees.

Continuing with FIG. 1, light reflected from mirror 16c is made incident upon the beam splitter 14 at an angle of incidence of about forty-five degrees. For a fifty percent reflectivity beam splitter, about half of the light from mirror 16c is reflected onto the output beam path and about half of the light from mirror 16c passes through the beam splitter 14 on a beam path toward mirror 16a, as shown. Thus, the output beam path includes a combined beam containing the portion of the initial beam 12 that passed through the beam splitter 14 and the portion of light from mirror 16c that is reflected from the beam splitter 14. Similarly, the light on the path from the beam splitter 14 to mirror 16a includes a combined beam containing the portion of the initial beam 12 that is reflected by the beam splitter 14 and the portion of light from mirror 16c that is transmitted through the beam splitter 14.

Figure 2:
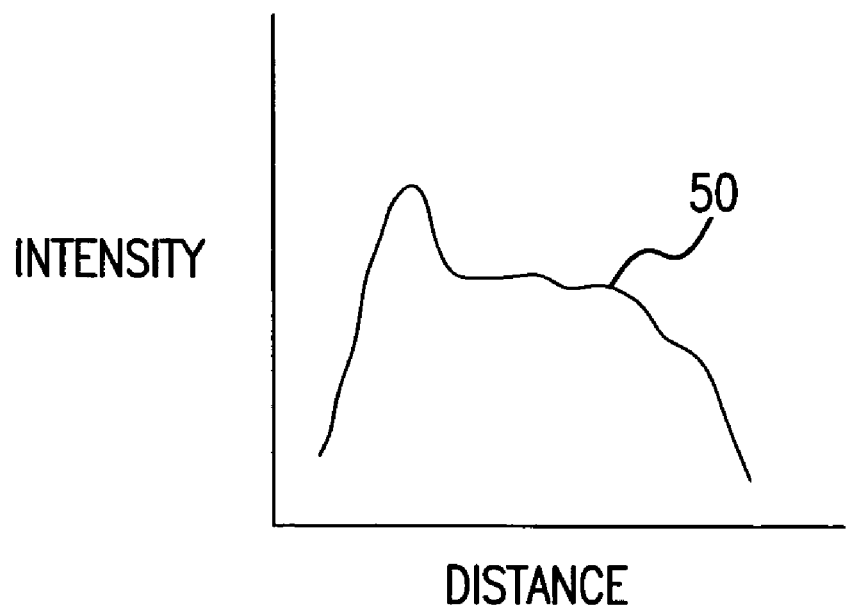
FIG. 2 illustrates a typical beam profile along an axis of a beam exiting an excimer discharge laser.
Figure 3:
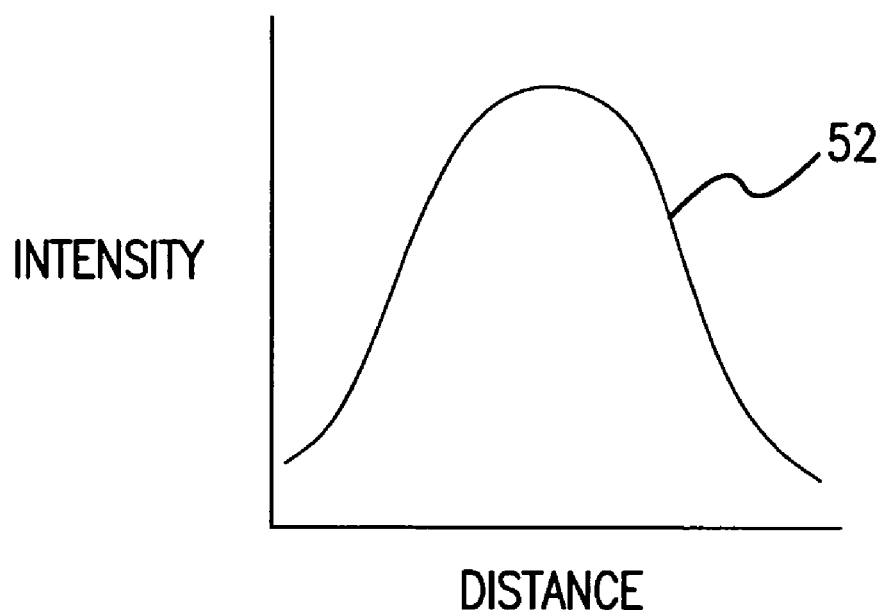
FIG. 3 illustrates a symmetric beam profile.

The beam entering the beam mixer 10 in FIG. 1 is shown having a rectangular-cross-section that defines a long axis 18. This type of beam is typical of a laser beam produced by an excimer laser with the long axis corresponding to the direction from one discharge electrode to the other. A typical beam may have dimension of about 3 mm by 12 mm. Moreover, for the output of an excimer laser, the intensity profile in the long axis 18 is typically unsymmetrical (see graph 50 FIG. 2) whereas the intensity profile in the short axis (i.e. the axis normal to the long axis) is approximately Gaussian (see graph 52 on FIG. 3). Although the beam mixer 10 shown is particularly suitable for improving symmetry of a high power excimer discharge laser, it is to be appreciated that it can be used in conjunction with other types of laser systems and for other applications, for example, the beam mixer may be used to reduce coherency in a beam generated by a solid state laser.

FIG. 1 shows that the beam extends along the axis 18 from a first edge 20 to a second edge 22. FIG. 1 also shows that the mirrors 16a-c establishing a spatially inverting path which has a beginning 24 and an end 26. As FIG. 1 illustrates, the inverting path may be characterized in that a part of the beam near the first beam edge 20 at the beginning 24 of the inverting path translates to the second beam edge at the end 26 of the inverting path. More specifically, for the mixer 10 shown, a photon at the 'top' of the beam which strikes mirror 16a translates and leaves mirror 16c at the 'bottom' of the beam. Since the inverting path constitutes a delay path, there will be some temporal stretching of the pulse, however, this can be minimized by minimizing the delay path.

Figure 4:
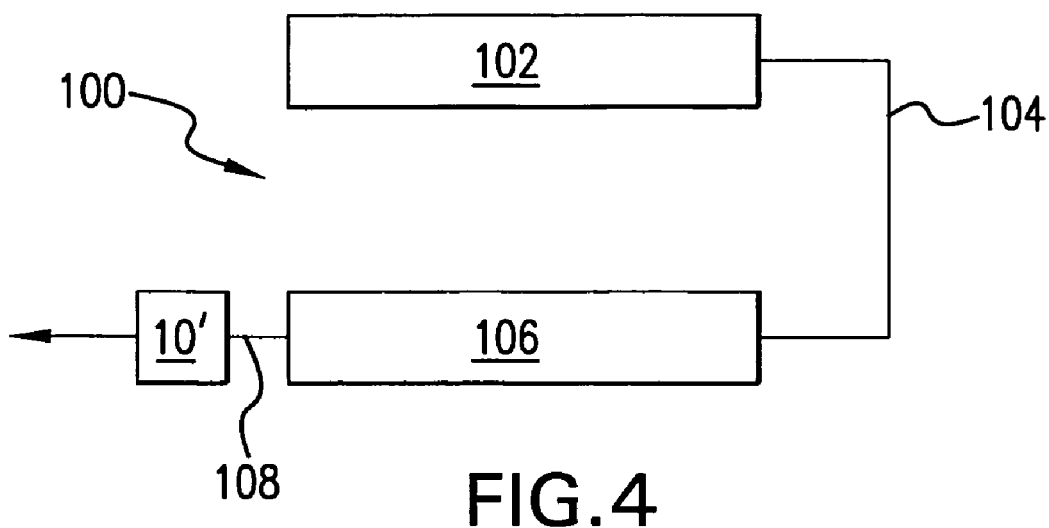
FIG. 4 shows a first embodiment of a laser source having a beam mixer.

FIG. 4 illustrates a laser source (generally designated 100) having an oscillator 102 which produces a beam 104 and an amplifier 106 which receives and amplifies the beam 104. FIG. 4 also shows that the source 100 may include a beam mixer 10', as described above, for increasing intensity symmetry along a selected axis of the beam. In the arrangement shown, the amplifier 106 outputs an amplified beam 108 which is feed into the beam mixer 10'. For the source 100, the oscillator may be a pulsed gas discharge laser, such as a KrF excimer laser, an XeF excimer laser, an ArF excimer laser or molecular fluorine laser and may or may not be line narrowed using a dispersive optic such as one or more gratings, prisms, etalons, etc. Other types-of lasers may be-used, such as cavity dumped lasers, mode-locked or Q-spoiled. The oscillator may be pulsed or continuous, and may be a $CO_2$ gas discharge laser, dye laser, or solid state laser, e.g. fiber laser, diode laser, etc. For the source 100, the amplifier may be may be pulsed or continuous and may be an excimer laser, molecular fluorine laser, $CO_2$ gas discharge laser, dye laser, or solid state laser, e.g. fiber laser, diode laser, etc. More than one amplifier may be used, in series or in parallel.

Figure 5:
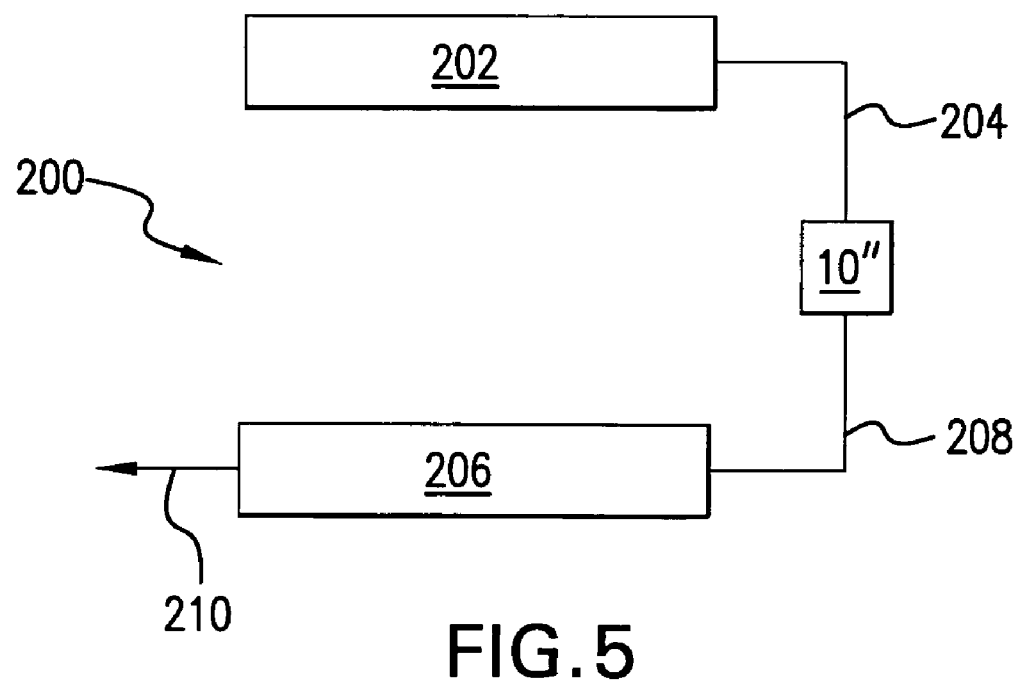
FIG. 5 shows another embodiment of a laser source having a beam mixer.

FIG. 5 shows another embodiment in which a laser source (generally designated 200) having an oscillator 202 which produces a seed beam 204 and an amplifier 206. FIG. 5 also shows that the source 200 may include a beam mixer 10", as described above, for increasing intensity symmetry along a selected axis of the seed beam. In the arrangement shown, the oscillator 202 outputs a seed beam 204 which is feed into the beam mixer 10". The mixed beam 208 is then feed into the amplifier 206 which amplifies the beam 208 and outputs and amplified beam 210.

For the source 200, the oscillator may be a pulsed gas discharge laser, such as a KrF excimer laser, an XeF excimer laser, an ArF excimer laser or molecular fluorine laser and may or may not be line narrowed using a dispersive optic such as one or more gratings, prisms, etalons, etc. Other types of lasers may be used, such as cavity dumped lasers, mode-locked or Q-spoiled. The oscillator may be pulsed or continuous, and may be a $CO_2$ gas discharge laser, dye laser, or solid state laser, e.g. fiber laser, diode laser, etc. For the source 200, the amplifier may be pulsed or continuous and may be an excimer laser, molecular fluorine laser, $CO_2$ gas discharge laser, dye laser, or solid state laser, e.g. fiber laser, diode laser, etc. More than one amplifier may be used, in series or in parallel.

Although a single beam mixer 10', 10" is shown in FIGS. 4 and 5, for altering an intensity profile along a selected axis of a beam, it is to be appreciated that two beam mixes could be employed, in series, with a first beam mixer altering an intensity profile along a first axis of a beam and a second beam mixer altering an intensity profile along a second axis of a beam. For example, the first and second axes could be orthogonal.

While the particular aspects of embodiment(s) described and illustrated in this patent application in the detail required to satisfy 35 U.S.C. §112 is fully capable of attaining any above-described purposes for, problems to be solved by or any other reasons for or objects of the aspects of an embodiment(s) above described, it is to be understood by those skilled in the art that it is the presently described aspects of the described embodiment(s) of the present invention are merely exemplary, illustrative and representative of the subject matter which is broadly contemplated by the present invention. The scope of the presently described and claimed aspects of embodiments fully encompasses other embodiments which may now be or may become obvious to those skilled in the art based on the teachings of the Specification. The scope of the present invention is solely and completely limited by only the appended claims and nothing beyond the recitations of the appended claims. Reference to an element in such claims in the singular is not intended to mean nor shall it mean in interpreting such claim element "one and only one" unless explicitly so stated, but rather "one or more". All structural and functional equivalents to any of the elements of the above-described aspects of an embodiment(s) that are known or later come to be known to those of ordinary skill in the art are expressly incorporated herein by reference and are intended to be encompassed by the present Claims. Any term used in the Specification and/or in the Claims and expressly given a meaning in the Specification and/or Claims in the present application shall have that meaning, regardless of any dictionary or other commonly used meaning for such a term. It is not intended or necessary for a device or method discussed in the Specification as any aspect of an embodiment to address each and every problem sought to be solved by the aspects of embodiments disclosed in this application, for it to be encompassed by the present Claims. No element, component, or method step in the present disclosure is intended to be dedicated to the public regardless of whether the element, component, or method step is explicitly recited in the Claims. No claim element in the appended Claims is to be construed under the provisions of 35 U.S.C. §112, sixth paragraph, unless the element is expressly recited using the phrase "means for" or, in the case of a method claim, the element is recited as a "step" instead of an "act".

It will be understood by those skilled in the art that the aspects of embodiments of the present invention disclosed above are intended to be preferred embodiments only and not to limit the disclosure of the present invention(s) in any way and particularly not to a specific preferred embodiment alone. Many changes and modification can be made to the disclosed aspects of embodiments of the disclosed invention(s) that will be understood and appreciated by those skilled in the art. The appended Claims are intended in scope and meaning to cover not only the disclosed aspects of embodiments of the present invention(s) but also such equivalents and other modifications and changes that would be apparent to those skilled in the art.

What is claimed is:

1. A system for generating a laser line beam to crystallize a film, the system comprising;
   a laser source generating a laser beam having an non-symmetric intensity profile along an axis transverse to a beam propagation direction;
   a homogenizer for homogenizing the beam; optics for focusing the beam in a first axis and expanding the beam in a second axis; and a beam mixer positioned along a beam path between the laser source and homogenizer and oriented to increase intensity symmetry along the axis, the beam extending from a first edge to a second edge along the axis, the beam mixer comprising:
   a plurality of mirrors establishing a spatially inverting path, the inverting path having a beginning and an end and being characterized in that a part of the beam near the first beam edge at the beginning of the path translates to the second beam edge at the end of the path;
   an optic dividing the beam into first and second beam portions, the optic placing the first portion onto the inverting path and recombining the first and second portions onto a common path after the first portion has traveled along the inverting path thereby mixing the beam.

2. A system as recited in claim 1 wherein the optic is a beam splitter reflecting the first portion of the beam onto the inverting path.

3. A system as recited in claim 1 wherein the plurality of mirrors comprises three mirrors.

4. A system as recited in claim 3 wherein the mirrors are flat mirrors.

5. A system as recited in claim 1 wherein the inverting path extends substantially orthogonal to the common path.

6. A system as recited in claim 1 wherein the length of the inverted path is less than a pulse length of an pulse input to the mixer.

7. A system for generating a laser line beam to crystallize a film, the system comprising;
   a laser source gnerating a laser beam having an non-symmetric intensity profile along an axis transverse to a beam propagation direction;
   a homogenizer for homogenizing the beam; optics for focusing the beam in a first axis and exoanding the beam in a second axis; and a beam mixer positioned along a beam path between the laser source and homogenizer and oriented to increase an intensity profile along the axis, the beam extending from a first edge to a second edge along the axis, the beam mixer comprising:

an optical inverting means for translating a part of the beam near the first beam edge at a first location along the beam to the second beam edge at a second location along the beam; and a means for directing a first portion of the beam to the inverting means, directing a second portion onto a common beam path and directing an output of the inverting means onto the common beam path.

8. A system as recited in claim 7 wherein the directing means comprises a beam splitter.

9. A system as recited in claim 7 wherein the beam splitter reflects 40 to 60 percent of light incident upon the beam splitter to the inverting means.

10. A system as recited in claim 7 wherein the inverting means comprises a plurality of mirrors.

11. A system as recited in claim 10 wherein the plurality of mirrors is three flat mirrors.

12. A system as recited in claim 11 wherein the three flat mirrors is a first mirror, second mirror and third mirror with the first mirror oriented to receive a beam from the directing means at an angle of incidence of approximately thirty degrees, the second mirror oriented to receive a beam from the first mirror at an angle of incidence of approximately thirty degrees, and the third mirror oriented to receive a beam from the second mirror at an angle of incidence of approximately thirty degrees.

* * * * *